US005215812A

United States Patent [19]

Kano et al.

[11] Patent Number: 5,215,812

[45] Date of Patent: Jun. 1, 1993

[54] COATED PRINTING PAPER

[75] Inventors: Isao Kano; Hideki Fujiwara; Katsuhiko Matsunaga; Kunio Hata, all of Tokyo, Japan

[73] Assignee: Jujo Paper Co., Ltd., Tokyo, Japan

[21] Appl. No.: 493,802

[22] Filed: Mar. 15, 1990

[30] Foreign Application Priority Data

Nov. 27, 1989 [JP] Japan .................................. 1-307888

[51] Int. Cl.[5] .......................... B32B 3/00; B32B 5/16; B32B 23/08; D21H 19/44

[52] U.S. Cl. .................................... 429/219; 428/206; 428/207; 428/323; 428/507

[58] Field of Search ............... 428/219, 507, 323, 206, 428/207, 339

[56] References Cited

U.S. PATENT DOCUMENTS

| | | |
|---|---|---|
| 3,028,258 | 4/1962 | Rice . |
| 3,312,564 | 4/1967 | Barbour . |
| 3,779,800 | 12/1973 | Heiser . |
| 4,198,471 | 4/1980 | Nelson . |
| 4,317,849 | 3/1982 | Ogura et al. . |
| 4,370,389 | 1/1983 | Ogura et al. . |

FOREIGN PATENT DOCUMENTS

| | | |
|---|---|---|
| 59-22683 | 2/1984 | Japan . |
| 2-140271 | 5/1990 | Japan . |
| 3-097997 | 4/1991 | Japan . |

OTHER PUBLICATIONS

J. W. Vanderhoff, "Mechanism of Film Formation of Latices", Br. Polym. J., 1970, vol. 2, May.

*Primary Examiner*—P. C. Sluby

*Attorney, Agent, or Firm*—Sherman and Shalloway

[57] ABSTRACT

A process is provided for producing a coated printing paper by first applying a pigment containing layer, superposing thereon a surface layer of a thermoplastic polymeric latex having a second-order transition temperature of at least 80° C., and treating the surface layer with a calendar at a temperature less than the second-order transition temperature, to produce a coated printing paper having both superior printability and high gloss.

6 Claims, 1 Drawing Sheet

COATED PRINTING PAPER

BACKGROUND OF THE INVENTION

1. Field of the Invention

The present invention relates to a process for producing a coated high-gloss paper having superior printability.

2. Prior Art

Paper having a coating composed of pigment and binder are used as high grade printing paper when the surface gloss is an important factor, besides printability, including ink-absorbency, coated-layer strength, etc. For enhancing the gloss, however, smoothing the coated layer with a press causes the destruction of voids therein, thereby lowering the ink absorbency. For enhancing the gloss, the use of a large amount of water-soluble or -dispersible polymer, such as polymeric latex, which is used as a binder for pigment, increases the strength and gloss of the coated layer, but lowers its ink-absorbency by decreasing the voids.

The type and amount of pigment and binder, the amount of coating material, the degree of smoothing treatment and the like are determined based on a consideration of the appropriate balance of gloss and printability. Therefore, other techniques are required for the production of a high gloss paper having a superior printability.

The gloss value of the coated printing paper is generally increased in the following order: slightly coated paper, coated paper, art paper, superart paper and cast-coated paper. The term "high gloss" as used herein means a higher gloss value than that of superart papers. Accordingly, "a high gloss paper" means a coated printing paper having a higher gloss value than that of superart paper. Conventionally, a cast-coater is used for the production of high gloss papers. The cast-coater applies a wet layer composed of pigment and binder by press-contacting the paper with a cast-drum having a mirror finish. The coated paper is dried by heating. This method has disadvantages including a remarkably slower production speed compared with methods used for the production of conventional art papers, coated papers, and slightly coated papers.

Further, a method using a heated calendar without using cast-drums is well-known. For example, Japanese Patent Laid-Open Application No. 56-68188, Japanese Patent Publication Nos. 64-10638 and 64-11758, disclose a method for coating a mixture of pigment and polymeric latex or water-soluble polymer, drying the resultant coated-layer, and further treating the coated layer with a heated calendar. In this case, a polymeric latex having a glass transition temperature of at least 5° C. or at least 38° C. is used as the latex, and the temperature of a heated calendar is set at a temperature higher than the gloss transition temperature of the latex. Since this method uses a calendar treatment of a latex, it is simplified and superior in productivity, but it has as a defect an insufficient gloss. This method does not provide a higher gloss than that of superart papers, and, therefore, it does not provide the same gloss as that of cast-coated papers.

Another paper coating method is disclosed in Japanese Patent Laid-Open Application No. 59-22683. This method comprises coating a combination of at least two polymeric latexes having various minimum film-forming temperatures on an uncoated sheet, or on a coated sheet, drying the coated sheet, and optionally smoothing the sheet with a calendar. In this case, drying of the combined latexes having various minimum film-forming temperatures causes fine cracks on the surface of the coated paper, thereby resulting in a superior ink-absorbency without impairing the gloss. The important feature of the above technique is in causing fine cracks on the surface of the coated sheet, wherein special care must be exercised in the drying step. That is, the drying conditions must be set so as to completely melt the latex having a higher minimum film-forming temperature and, partly melt the latex having a lower minimum film-forming temperature. However, as is well-known, the drying conditions are easily varied by many factors. Considering industrial application of this technique, it is practically impossible to maintain the drying conditions uniform and constant over an entire production system. Therefore, it is very difficult to maintain a constant stable product quality.

SUMMARY OF THE INVENTION

It is the primary object of the invention to provide a coated printing paper having both superior printability and high gloss. Another object of the invention is to provide a process for producing easily and inexpensively a coated printing paper having both superior printability and high gloss.

These objects are achieved by providing a process for the production of a coated printing paper which comprises applying to substrate a pigmented layer and then superposing thereon a surface-layer consisting of thermoplastic polymeric latex having a second-order transition temperature of at least 80° C., and treating the surface-layer with a calendar at a temperature less than the second-order transition temperature. The secondary purpose can be achieved by using a process which comprises forming on a substrate a pigmented layer, coating thereon a thermoplastic polymeric latex of a second order transition temperature of at least 80° C. to prepare a surface-layer, drying and then treating the surface-layer with a calendar at a temperature less than the second-order transition temperature.

DESCRIPTION OF THE PREFERRED EMBODIMENTS

Figure 1:
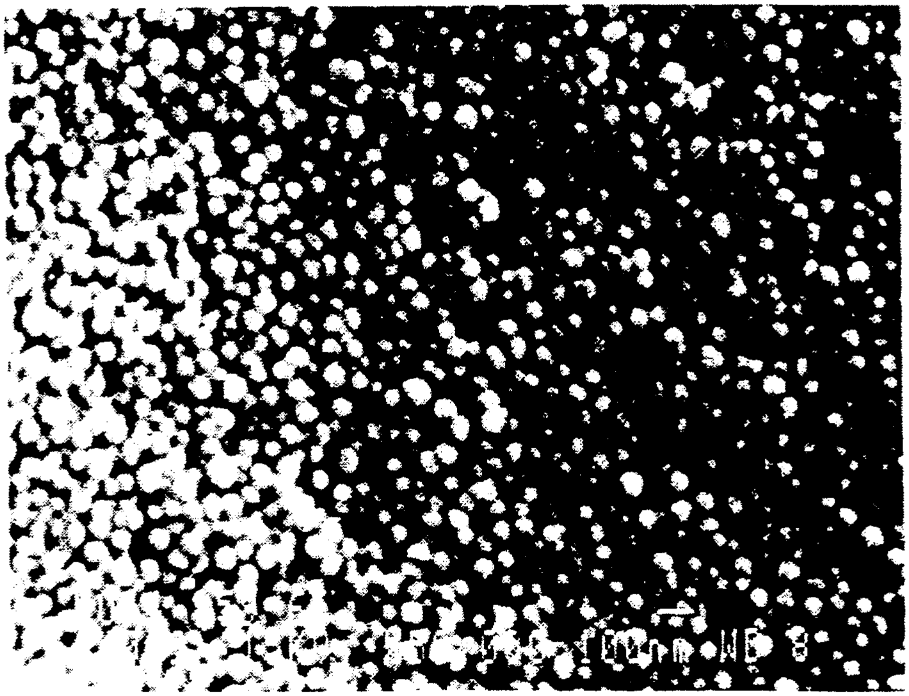
FIG. 1 shows an electron-microphotograph of the surface of the coated printing paper in Example 1.

As printing base-materials, there are used papers, synthetic papers, plastic films, non-woven clothes and the like. Among the above materials, papers are widely used. Papers are classified as pigment-coated papers, such as art paper, coated paper, slightly coated paper, coated white board, etc.; and into non-coated papers, such as wood-free paper, wood-containing paper, newsprint paper, glazed paper, supergravure paper, etc. In order to provide both high gloss and superior printability, the base-material of the present invention should be selected from the above-described base-materials.

The substrate of the present invention can include wood-containing paper, and wood-free paper, etc. The process for forming a pigmented layer on an uncoated paper can be carried out by the conventional process for producing a pigmented layer on paper, but the pigment in the coating material, the kind of binder, and the ratio of binder to pigment can be varied depending upon the desired quality. Paper having a coating on one or both sides (having a coating of 2–40 $g/m^2$. side) can be used as the pigment coated-paper of the present invention. After the pigment-coating is applied, a thermoplastic polymeric latex is applied on the pigment-coated layer to prepare the surface layer. Before the latex-coating, the pigmented layer can optionally be smoothed by means of a super calendar, gloss calendar, and the like.

The application of thermoplastic polymeric latex on a non-coated paper (as base-material) provides good printability, but not a high gloss.

The thermoplastic polymeric latex layer on a synthetic paper or plastic film (as base-material) provides a poor printability due to dryability problems.

The thermoplastic polymeric latex used in the present invention is an emulsion of thermoplastic polymer or copolymer (hereinafter referred to as "polymeric latex") having a second-order transition temperature of at least 80° C. In a core-shell type latex, the shell part preferably has a second-order transition temperature of at least 80° C. The polymer-latex having a second-order transition temperature of at least 80° C. is used in the present invention regardless of the monomer species and production process employed. The preferred monomers include, for example, styrene, derivatives thereof, vinylidene chloride, acrylate or methacrylate.

The upper limit of the second-order transition temperature is not otherwise limited, but is substantially selected depending upon the monomer species, and the additives, such as plasticizer, for producing the polymeric latex. In general, this upper limit is about 130° C.

The use of polymeric latex having a second-order transition temperature below 80° C. causes an adhesion of the coating to the calendar roll, and results in a coated paper with insufficient gloss, low surface strength and poor printability.

The objectives of the present invention are not achieved with coated papers having these defects.

In general, the particle size of latex used for the paper coating of the present invention is smaller than the latex used in other fields such as in paint where the average particle size of latex can be 100–500 nm. In the present invention it is preferred that the polymeric latex have an average particle size of less than 100 nm.

The polymeric latex layer of the present invention is applied as the sole coating on the pigmented layer. Various additives can be added to the polymeric latex in amounts which do not detract from the purpose of the present invention. Additives which can be used are as follows: natural or synthetic coating-binders, fluidity-adjusting agents for the control of coating suitability, antifoamers, lubricants to prevent adhesion to calendar rolls, coloring agents for the coloration of a coating layer surface, a small amount of pigments, and the like. The above additives can be mixed in appropriate amounts to prepare a coating material suitable for use as a surface-layer.

The resultant coating material for the surface-layer is applied on the pigmented layer, thereby to produce a surface-layer. The amount of coating applied can be suitably adjust to obtain a desired quality. With a large amount of the coating material, production costs are increased, ink absorbency is reduced, ink set is insufficient, and the strength of the surface layer is lowered. Accordingly, the use of a large amount of the coating material is not advantageous. In ordinary cases, it is suitable to use a coating in an amount of at least 0.1 $g/m^2$, preferably 0.3–3 $g/m^2$ on one side of a coated paper.

The coating material for the surface-layer can be applied by means of conventional equipment used in paper coating, for example, by a blade coater, roll coater, air-knife coater, bar coater, gravure coater, flexo coater, and the like. If the polymeric latex of the present invention is used, the drying of this coating requires no specific equipment, and can be carried out with drying systems conventionally used for the production of coating papers.

The obtained surface-layer is treated with a calendar to prepare a high gloss-layer. The type of calendar used is not otherwise limited, and a super-calendar and/or gloss-calendar used for smoothing a coated paper are generally employed. However, the calendar-treatment, of which the conditions are important, must be made at a temperature below the second-order transition temperature of the polymeric latex used as the surface-layer. Any temperature below the second-order transition temperature can be used. However, it is preferred to use a temperature at least 5° C. lower, more preferably 10°–30° C. lower, than the second-order transition temperature.

It is unknown why the coated printing paper of the present invention has both superior printability and high gloss. However, observations of the glazed surface-layer of the present invention have been made as described below.

FIG. 1 shows an electron-microscopic photograph of the surface-layer of the coated printing paper produced by the process of the present invention. As seen in FIG. 1, the surface-layer does not consist of a uniform film formed by melting a polymeric latex. Instead the surface layer has a structure in which polymeric latex particles of from about several to ten nanometer are separated from each other. This photograph of FIG. 1, shows that the polymeric latex, owing to its high second-order transition temperature of at least 80° C., has the same form and size of particles as the latex coating material, and with the conventional drying conditions and the subsequent calendar treatment, (below the second-order transition temperature) the surface coating has not melted to form a continuous film. There appears to be many voids between polymeric latex particles, so that a printing ink fills in the voids and passes through the capillaries formed between the latex particles. Consequently, printing ink penetrates the latex coating and reaches the pigmented layer, where it is absorbed.

It has been found that the surface layer has the form and size of the latex-particles without melting as shown in FIG. 1, and the surface layer has no film strength. However, the glazed surface-layer on the paper of the present invention has sufficient strength. The reason for the sufficient strength is unknown, but it is believed that the polymeric latex having a second-order transition temperature of 80° C. has a certain hardness in a calendar treatment. Accordingly, the calendar treatment after the application of the latex on the pigmented layer, causes complicated effects of the properties, such as packing, elasticity, etc. of a pigmented layer, the properties of the polymeric latex determined by hardness, particle size, coating amount, etc., and the mutual chemical affinities of latex, under a high pressure of the calendar treatment. That is, it is believed that the increase of the surface strength, is due to the above complicated actions, i.e. by the so-called mechanochemical effects.

Considering the conventional view that a practically uniform continuous surface is required to obtain a high gloss, it is unexpected that the surface of the polymeric latex provides a high gloss despite retaining the particle form. Based on the above photograph, the reason seems to be that the cavities in the pigmented layer are filled with the small sized polymeric latex particles so that the resulting surface-layer is optically smoothed.

Considering that the surface-layer of a coated printing paper in Comparative Example 1 described hereinafter has a particle size of polymeric latex as seen in Table 1, it is believed that the other factors relate to the mechanism of the effects of the present invention. However, it is unknown what these factors are.

Since, in the production of a coated printing paper, the drying and calendering conditions are the same as those used in the production of commercial coated papers, a coated paper having a certain standard quality is produced without damaging the productivity.

The following examples serve to illustrate the present invention in more details although the present invention is not limited to the examples. Unless otherwise indicated, all parts and percentages are by weight.

EXAMPLES

The Production of Polymeric Latex for Over-Coating

PREPARATION EXAMPLE 1

300 parts of water, 9 parts of sodium dodecylbenzene sulfonate and 4 parts of polyoxyethylene nonyl phenol ether (10 moles of ethylene oxide addition) were placed in a four-necked flask equipped with a stirrer, a thermometer, a cooler, a dropping funnel and a nitrogen gas inlet, and them mixed to prepare a mixed substance.

80 parts of styrene, 10 parts of α-methylstyrene and 100 parts of methyl methacrylate were mixed to prepare a monomer mixture. 60 parts of the monomer mixture were added to the mixed substance, and then heated to 60° C. in a nitrogen atmosphere. Further, 7.2 parts of a 20% aqueous ammonium persulfate solution and 4.8 parts of a 20% anhydrous sodium bisulfite solution were added thereto and polymerized for 60 minutes. After adding 10 parts of 20% aqueous ammonium persulfate solution and 4.8 parts of a 20% ammonium persulfate solution, 140 parts of the above monomer mixture were added dropwise thereto for one hour, and were maintained at 90° C. for 4 hours. After the completion of polymerization, a copolymeric latex of ethylenic monomer having a second-order transition temperature of 107° C. and a solid content of 39% was obtained.

PREPARATION EXAMPLE 2

310 parts of water, 5.6 parts of ammonium polyoxyethylene nonyl phenyl ether sulfate (HITENOL N-03, manufactured by DAI-ICHI KOGYO SEIYAKU CO., LTD) 48 parts of styrene, 19 parts of methyl methacrylate, 8 parts of ethyl methacrylate, 2.5 parts of divinyl benzene and 2.5 parts of methacrylic acid were placed in a four-necks flask equipped with a stirrer, a thermometer, a cooler, a dropping funnel, and were heated to 70° C. under a nitrogen atmosphere. 5 parts of 16% aqueous potassium persulfate solution were added thereto and maintained at 85° C. for 4 hours. After the completion of polymerization, a copolymeric latex (B) of ethylenic monomer having a second-order transition temperature of 85° C. and a solid content of 21.2% was obtained.

PREPARATION EXAMPLE 3

The same procedure as that of Preparation Example 1 was carried out except that 88 parts of styrene, 38 parts of methylmethacrylate, 70 parts of n-butylmethacrylate and 4 parts of methacrylic acid were used instead of the monomer of Preparation Example 1, wherein a copolymeric latex was obtained having a second-order transition temperature of 68° C. and a solid content of 39%

Preparation of a Base Material (A Coated-Paper)

70 parts of 1st class kaolin, 30 parts of fine ground calcium carbonate, 13 parts (solid content) of styrene-butadiene copolymeric latex and 5 parts (solid content) of a 35% aqueous starch solution were mixed to produce a coating color of a 64% solid content. The coating color was applied to a wood-free base paper having a weight of 127 g/m$^2$ in an amount of 14 g/m$^2$ per side (dry basis) by means of a blade coater with a coating speed of 500 m/min. After drying, a base material having a 5.5% moisture content for upper-coating (a pigment-coated paper) and having a pigmented layer was obtained.

EXAMPLES 1, 2 AND 3 AND COMPARATIVE EXAMPLE 1

90 parts (solid content) of a copolymeric latex having a second-transition temperature of 107° C., 5 parts (solid content) of polyethylene wax emulsion-type releasing agent and 5 parts (solid content) of calcium stearate-type lubricant were mixed to produce an upper-coating solution of a 30% solid content. The resultant coating solution was applied in an amount of 1.6 g/m$^2$ side (dry basis) on a base material (pigment-coated paper). After drying, an upper-coated paper having a 6.5% moisture content was obtained. The resultant coated paper was treated under a nip pressure of 180 kg/cm through two nips of a supercalendar consisting of chilled rolls and cotton rolls so as to contact the upper-coated surface with the metal roll. In this manner, a coated paper having a high gloss was obtained.

Examples 1 and 2 were carried out at chilled roll temperatures of 65° C. and 82° C., respectively. On the other hand, an upper-coated paper was treated under a nip pressure of 1000 kg/cm through two nips of a gloss calendar consisting of chilled rolls and heat-resistant rolls, so as to contact the upper-coated surface with the metal roll. Example 3 was carried out at a chilled roll temperature of 95° C., and Comparative Example 1 was carried out at a chilled roll temperature of 120° C., i.e. a temperature higher than a second-order transition temperature of copolymeric latex.

EXAMPLES 4, 5 AND 6

The upper-coated solution and base paper in Example 2 and supercalendaring conditions, including a roll temperature of 82° C., were carried out in the same manner as in Example 2, wherein one to several coatings were applied by means of a blade coater (manufactured by Kumagaya Riki Co.,) to produce a paper having a high gloss. Examples 4, 5 and 6 had upper-coated weights of 0.7 g/m$^2$, 2.8 g/m$^2$ and 5.5 g/m$^2$, respectively.

EXAMPLES 7 AND 8, AND COMPARATIVE EXAMPLE 2

Examples 7 and 8, and Comparative Example 2 were carried out in the same manner as in Examples 1–3, and Comparative Example 1, except for using a 20% coating solution having contents of 80 parts (solid content) of the copolymeric latex (B) with a second-order transition temperature of 85° C., 10 parts (solid content) of polyethylene wax-type lubricant, 10 parts (solid content) of calcium stearate-type lubricant and coating amount of 1.6 g/m$^2$ in Examples 1-3 and, Comparative Example 1 is changed to 1.2 g/m$^2$, and the other operation is the same as in Examples 1-3, and Comparative Example 1. In this manner, upper-coating papers of high gloss were obtained. Examples 7 and 8 were carried out at chilled roll temperatures of 65° C. and 82° C., respectively, (lower temperature than a second-order transition temperature of copolymeric latex), and Comparative Example 2 was carried out at a chilled roll temperature of 120° C., a temperature higher than the second-order transition temperature of the copolymeric latex.

COMPARATIVE EXAMPLES 2 AND 4

Comparative Examples 3 and 4 were carried out in the same manner as in Examples 1 and 3, except for using the copolymeric latex having a second-order transition temperature of 72° C. and a coating amount of 1.4 consisting of chilled rolls and cotton rolls adjusted at a temperature of 82° C., to obtain an upper-coated paper.

COMPARATIVE EXAMPLE 6

On the base material having a pigmented layer used in Example 1-3, there was applied a 30% upper-coating solution composed of 70 parts (solid content) of copolymeric latex (B), 25 parts (solid content) of the pigmented material used for application of the pigmented layer on the base material, and 5 parts (solid content) of calcium stearate type lubricant in an amount of 8.7 g/m$^2$ per side. The resultant upper-coated paper was treated in the same manner as in Example 8 by means of a calendar to prepare a high gloss paper.

The coated-papers obtained in the Examples and Comparative Examples were tested and evaluated for their qualities. In the test results, with the copolymeric latexes, the surface temperature of metal rolls in the calendar-treatment.

TABLE 1

| | Base paper | Kind of upper-coating resin (Tg °C.) | Coating amount of upper-coating resin (g/m−) | Kind of calendar (Roll Temp.) (°C.) | Adhesion to calendar | Gloss of nonprinting paper Reflectance at 60° | Printing gloss Reflectance at 75° | Ink setting | Dry picking resistance | Percentage missing dots-number |
|---|---|---|---|---|---|---|---|---|---|---|
| Example 1 | Pigment coated paper | A (107) | 1.6 | Super (66) | No-adhesion | 63.9% | 89.0% | ○ | High | 0.11 |
| Example 2 | Pigment coated paper | A (107) | 1.6 | Super (82) | | 71.5 | 92.2 | ○ | " | |
| Example 3 | Pigment coated paper | A (107) | 1.6 | Gloss (92) | | 62.9 | 88.6 | ○ | " | |
| Comparative Example 1 | Pigment coated paper | A (107) | 1.6 | Gloss (120) | Adhesion | 44.7 | 64.1 | ○ | Medium | 4.30 |
| Example 4 | Pigment coated paper | A (107) | 0.7 | Super (82) | No-adhesion | 68.4 | 90.8 | ○ | High | |
| Example 5 | Pigment coated paper | A (107) | 2.8 | Super (82) | No-adhesion | 72.3 | 93.0 | Δ | " | |
| Example 6 | Pigment coated paper | A (107) | 5.5 | Super (82) | Partial adhesion | 58.4 | 85.7 | Δ | " | 1.25 |
| Example 7 | Pigment coated paper | B (85) | 1.2 | Super (65) | No-adhesion | 65.1 | 87.6 | ○ | " | 0.11 |
| Example 8 | Pigment coated paper | B (85) | 1.2 | Super (82) | No-adhesion | 73.4 | 95.4 | ○ | " | |
| Comparative Example 2 | Pigment coated paper | B (85) | 1.2 | Gloss (120) | Adhesion | 38.8 | 56.8 | Δ | Medium | |
| Comparative Example 3 | Pigment coated paper | C (72) | 1.4 | Super (65) | Partial adhesion | 51.3 | 70.4 | Δ | Low | 3.22 |
| Comparative Example 4 | Pigment coated paper | C (72) | 1.4 | Gloss (95) | Adhesion | 32.2 | 49.5 | X | " | |
| Comparative Example 5 | Wood-free paper | B (85) | 2.6 | Super (82) | No-adhesion | 15.8 | 35.5 | ○ | " | 8.51 |
| Comparative Example 6 | Pigment coated paper | B (85) Pigment coating material | 8.7 | Super (82) | No-adhesion | 53.4 | 80.3 | ○ | High | 0.12 |

Note:
nonprinting glos of art paper and cast coated paper
(Reflectance at 60)
Super art (SA Kanafuji) 54.1%
Cast coat (Mirror coat platinum) 63.6% g/m$^2$ side (dry basis), wherein high gloss papers were obtained. Comparative Example 3 was made at a chilled roll temperature of 65° C., and a temperature lower than the second-order transition temperature. Comparative Example 4 was carried out at a chilled roll temperature of 95° C., a temperature higher than the second-order transition temperature.

COMPARATIVE EXAMPLE 5

An upper-coating solution of Example 7 using the copolymeric latex (B) was applied to an uncoated wood-free paper having a weight of a 127 g/m$^2$ in an amount of 2.6 g/m$^2$ per side, and was treated in the same manner as in Example 7 by means of a super-calendar The test methods and evaluations are as follows:

Gloss of unprinted paper

Gloss is determined by measuring the reflectance at an angle of 60° using a Murakami type gloss meter, since the reflectance at an angle of 75° exhibits the fast equal gloss-values in high gloss papers. As the standard gloss of unprinted paper, the reflectances at 60° and 75° are shown in a superart paper (SA) and cast-coated paper (CC).

| | Reflectance at 60° | Reflectance at 75° |
|---|---|---|
| S A : | 54.1% | 83.6% |

-continued

| | Reflectance at 60° | Reflectance at 75° |
|---|---|---|
| C C : | 63.6% | 84.7% |

S A : Superart paper
C C : Cast-coated paper

Printing Gloss

A paper is printed by means of an RI-II type printing tester, and is measured by a Murakami-type gloss meter using a reflectance of 75°.

Ink setting

A paper is printed by a means of RI-II type printing tester. Then, an unprinted paper is contacted with the printed surface. The degree of ink-transfer onto the unprinted paper is evaluated visually as follows:
○: means no ink-transfer onto an unprinted paper
Δ: means partial ink-transfer
×: means remarkable ink-transfer Gravure Printability A paper was printed by gravure printing tester (manufactured by Kumagaya Riki Co.) using a half tone gravure plate. The percentage (%) of missing dots-number, based on the total number of dots, is indicated.

As is clear from Table 1, the coated printing papers of the present invention have a higher gloss than super-art papers. This coated printing paper is superior in its printability, such as ink setting, dry picking resistance, dots, etc. Further, it is superior in the adhesion of the polymeric latex to the calendar rolls, that is, an index of the ease of production.

The Comparative Examples produced papers having an insufficient gloss. These papers are inferior or insufficient in some indices of printability or the adhesion to calendar rolls, which means that the object of the present invention is not achieved.

Effects

The process of the coated printing paper of the present invention comprises forming on a substrate a pigmented layer, applying thereon a thermoplastic polymeric latex having a second-order transition temperature of at least 80° C. to prepare the surface-layer, drying the resultant paper, and then treating the surface layer with a calendar at a temperature less than the second-order transition temperature. The process of the present invention provides a higher gloss paper than super-art papers, a sufficient printability including ink-setting, surface picking resistance, etc., and a superior productivity without the adhesion of the paper to calendar rolls.

What is claimed is:

1. A coated printing paper which comprises a paper substrate, a pigment-coated layer on one or both sides of said substrate, and superposed thereon a surface-layer of thermoplastic polymeric latex having a second-order transition temperature of at least 80° C. and an average particle size of less than 100 nanometers, said surface-layer having been treated by a calendar at a temperature less than said second-order transition temperature.

2. The coated printing paper according to claim 1, wherein the coating amount of said surface-layer is 0.3-3 g/m$^2$.

3. The coated printing paper according to claim 1, wherein said substrate is wood-free paper.

4. The coated printing paper according to claim 1, wherein the coating amount of said pigment-coated layer is from about 2 to 40 g/m$^2$ per side.

5. The coated printing paper according to claim 1, wherein said substrate is wood-containing paper.

6. A high gloss coated printing paper comprising
a paper substrate,
a pigment layer coated on one or both sides of the paper substrate in an amount of 2 to 40 g/m$^2$ per side, and
calendared surface-layer of thermoplastic polymer particles in an amount of 0.3 to 3 g/m$^2$, said thermoplastic polymer having a second-order transition temperature of from 80° C. to about 130° C., and said polymer particles having an average particle size of less than 100 nanometers, and forming a discontinuous coating on said pigment layer, whereby printing ink applied to said calendared surface-layer can penetrate to the pigment layer through the voids of the discontinuous coating of the polymer particles.

* * * * *